Feb. 5, 1952 E. M. SPLAINE 2,584,934
EYE PROTECTION DEVICE
Filed Jan. 17, 1947 2 SHEETS—SHEET 1
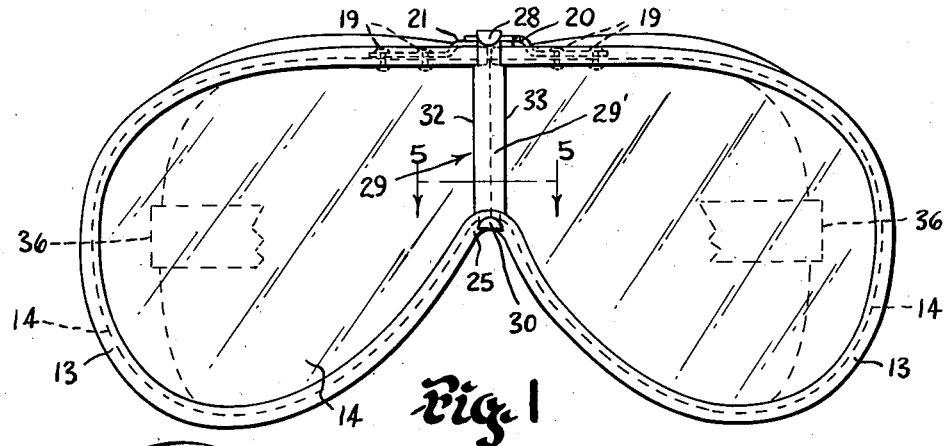
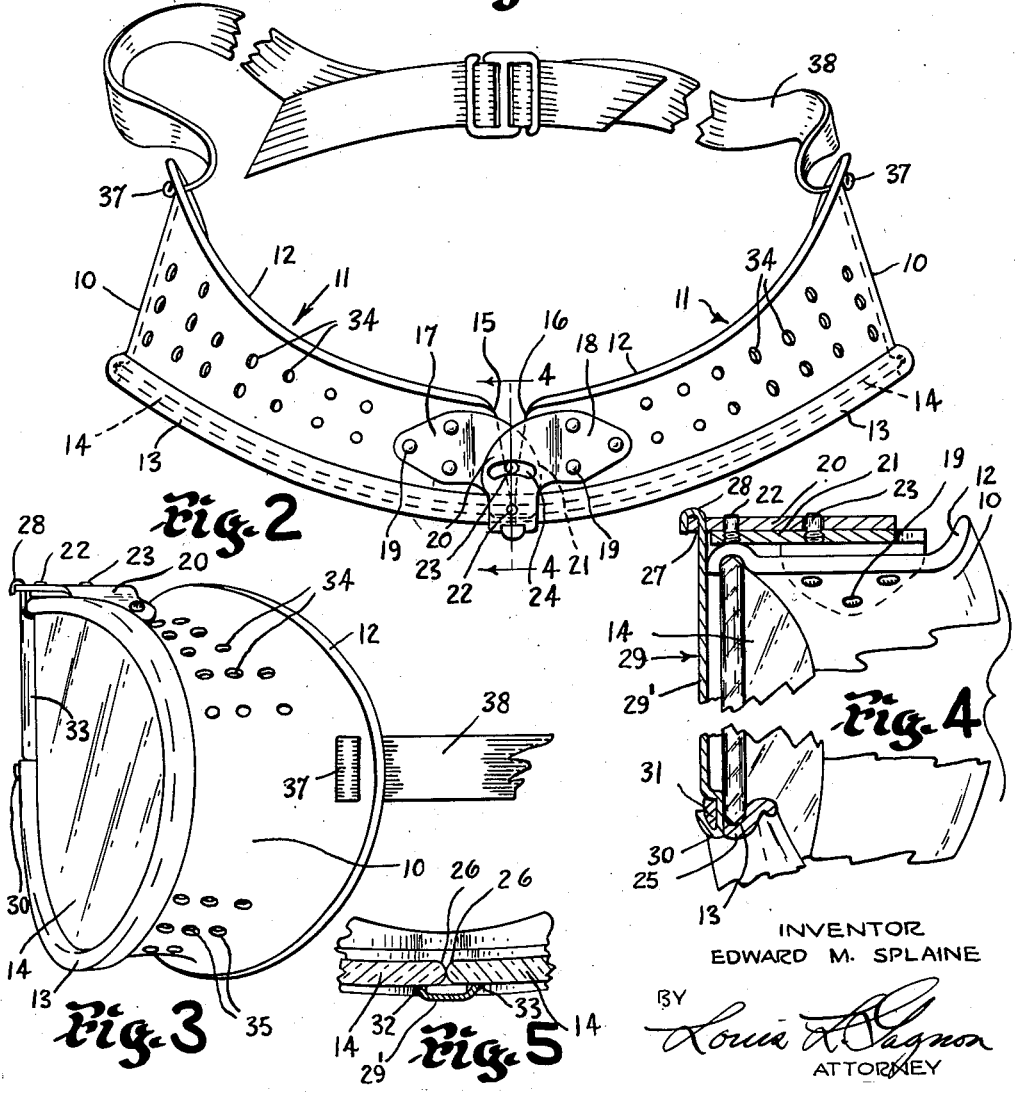
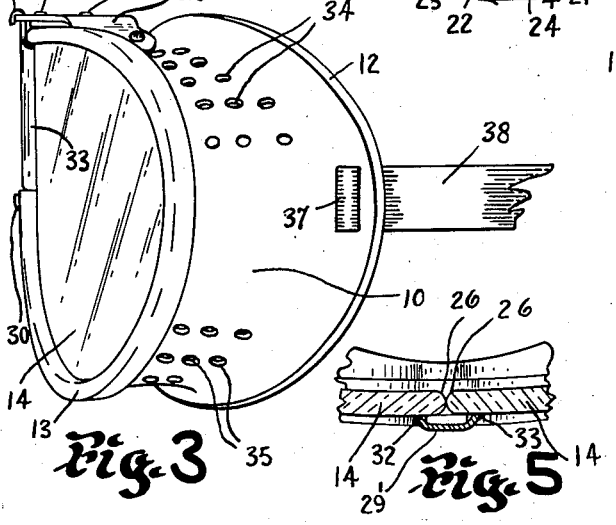
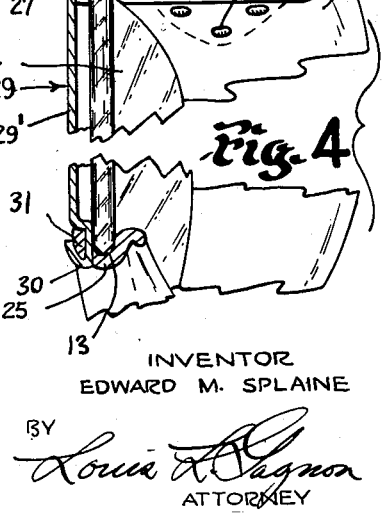
INVENTOR
EDWARD M. SPLAINE
BY
Louis L. Gagnon
ATTORNEY Feb. 5, 1952 — E. M. SPLAINE — 2,584,934
EYE PROTECTION DEVICE
Filed Jan. 17, 1947 — 2 SHEETS—SHEET 2

INVENTOR
EDWARD M. SPLAINE
BY
ATTORNEY

Patented Feb. 5, 1952

2,584,934

UNITED STATES PATENT OFFICE 2,584,934

EYE PROTECTION DEVICE

Edward M. Splaine, Southbridge, Mass., assignor to American Optical Company, Southbridge, Mass., a voluntary association of Massachusetts Application January 17, 1947, Serial No. 722,481

6 Claims. (Cl. 2—14)

This invention relates to eye protection devices or goggles of the type adapted particularly to surround the contours of the eyes and relates more particularly to providing such goggles with portions adjustable to the general facial characteristics of different individuals and method of making the same.

One of the principal objects of the invention is to provide a single aperture type goggle embodying two eye cup portions and two removable shield-like lens portions adjustably related with each other whereby the eye cups be adjusted to different angular relations without altering the spacial relation of the lens portions.

Another important object of the invention is to provide a single aperture type eye protection device having two major cup portions pivotally connected with each other and adjustable to fit the general facial characteristics of different individuals.

Another object is to provide an eye protection device of the above character formed of relatively light weight nonmetallic material having two major cup portions pivotally connected with each other and formed with face contacting edge portions shaped to the general contour of the face and having forwardly extending integrally related wall portions terminating in forwardly disposed lens receiving grooves having two major lens members, shaped substantially to the contour shape of the cup portions seated in the lens receiving grooves and having vertically disposed nasal edge portions in relatively intimate relation with each other and detachable means joining the intermediate portions of the cup portions and simultaneously retaining the lenses in the lens grooves while permitting said cup portions to be angled relative to each other.

Another object is to provide an eye protection device of the above nature having a nasal recess in the lower portion thereof and having its upper and lower walls provided with a plurality of ventilation perforations.

Another object is to provide an eye protection device of the above character with two major eye cup portions having members with superimposed flared lip portions on the nasal sides thereof pivotally connected with each other and means retaining said eye cup portions in pivotal relation with each other, said means being capable of being loosened an amount sufficient to enable the insertion or removal of the lenses from said eye cup portions.

Another object is to provide an eye protection device of the above character having two separate pivotally connected eye cup portions so formed and related with each other as to in effect produce a single aperture type protection device surrounding the two eyes with a clearance for affording free ventilation transversely of the nose.

Another object is to provide an eye protection device of the above character whose eye cup portions are adjustable to compensate for different widths of heads or faces and which will assume a comfortable fit with the face.

Another object is to provide an eye protection device of the above character which may be worn over prescriptive mountings and lenses and which will afford protection means for said mountings and lenses as well as for the eyes of the individual.

Another object is to provide an eye protection device of the above character which is simple in construction, inexpensive to manufacture and which is light in weight and comfortable in use and which will afford maximum protection.

Other objects and advantages of the invention will become apparent from the following description taken in connection with the accompanying drawings and it will be apparent that many changes may be made in the details of construction, arrangement of parts, and methods shown and described without departing from the spirit of the invention as expressed in the accompanying claims. The invention, therefore, is not limited to the exact details of construction, arrangement of parts and methods shown and described as the preferred form only is given by way of illustration.

Referring to the drawings:

Fig. 1 is a front elevational view of the device embodying the invention;

Fig. 2 is a top plan view of said device;

Fig. 3 is a side elevational view of said device;

Fig. 4 is an enlarged fragmentary sectional view taken as on line 4—4 of Fig. 2 and looking in the direction indicated by the arrows;

Fig. 5 is an enlarged fragmentary sectional view taken as on line 5—5 of Fig. 1 and looking in the direction indicated by the arrows;

Figure 6:
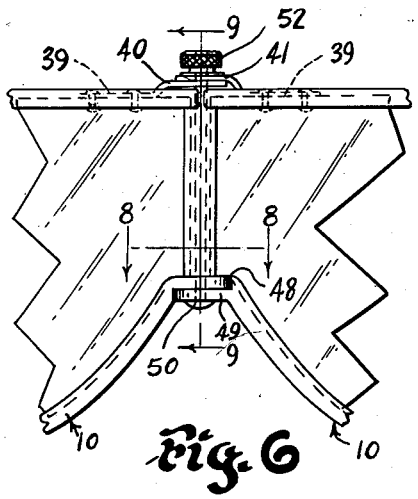
Fig. 6 is a fragmentary front elevational view of a modified form of the invention.

There have been several different types of goggles of this nature introduced to the trade but in all known instances in the past such goggles embodied a single shield type lens and a single unitary cup type frame support for the lens which was of a relatively rigid non-adjustable nature requiring goggles to be formed to various sizes with a view to fitting the general facial characteristics of different individuals, that is, individuals having a relatively wide full face to individuals having a relatively narrow face.

With eye protection devices of this prior art type, the particular fit of the goggle had to be accepted and no adjustments were possible and in most instances resulted in a poor and uncomfortable fit with the face.

Single aperture type goggles of the character described have a decided advantage in that they are light in weight, resistant to impact and afford free ventilation transversely of the eyes and throughout the entire area of the interior of the eye cup or lens frame while affording a maximum field of vision. The present invention retains all of the advantages of the prior art devices of this nature while providing a single commercial structure which may be adjusted to meet the general facial requirements of different individuals and to assume a comfortable fit with the face.

Another difficulty overcome is that of having to form the goggle to various different sizes in order to fit the general facial characteristics of different individuals. This has been accomplished by forming the single aperture type device embodying the invention in two major sections pivotally connected centrally thereof so as to permit the temporal sides of the two sections to be moved toward and away from each other to meet the facial requirements of different individuals. This also enables the goggles to be fitted over corrective spectacles when worn by the individual. The face contacting edge is provided with an outwardly rolled portion to afford a comfortable engagement with the face and the device is further provided with a large nose recess for aiding in avoiding injury to the nose of the individual should the device be subjected to sudden impact, particularly in a downward direction.

While overcoming the above major difficulties with a device of this nature, the said device is extremely light in weight, inexpensive to manufacture as well as providing a comfortable fit with maximum ventilation.

Referring more particularly to the drawings wherein like characters of reference designate like parts throughout the several views, the device embodying the invention comprises a pair of cup members 10 each having a face engaging edge portion 11 formed with an integral outwardly curling lip 12 for engaging the face of the wearer. The face contacting edge 11 is carefully controlled as to its shape so that it will fit the general facial characteristics of most individuals.

The main eye cup members are formed of non-metallic material, preferably transparent, plastic material such as cellulose acetate, cellulose nitrate, methyl methacrylate or other known artificial resins and in addition to having the integral face contacting edge portion 11 each have a forward integrally related grooved portion 13 adapted to receive the contour edge of the respective lenses 14.

The eye cup members embody integrally related wall portions extending throughout the tops, sides and bottoms thereof and extend upwardly intermediate the lower portions thereof to a nasal recess with the said eye cups being joined or in integral relation with each other at the top of said nasal recess.

The upper or top walls of the eye cups are divided on the nasal sides thereof and are provided with edges 15 and 16 angularly disposed relative to each other so as to permit the said eye cups to be moved outwardly and inwardly relative to each other with the limit of said movement being equal to the spacing between said edges 15 and 16.

The nasal portions of the top walls of the eye cups have plate members 17 and 18 secured thereto by rivets or the like 19. The said plates 17 and 18 are provided with overlapping integral tongues 20 and 21 which are pivotally connected with each other as illustrated at 22. The tongue 21 is provided with a pin 23 positioned within an arcuate slot 24 formed in the plate 20. This limits the outward movement of the cup members 10 relative to each other about the pivot 22. It is pointed out that the longitudinal axis of the pivot 22 is disposed along a line intermediate the outer and inner surfaces of the lenses 14 and extends along the line of division of the contiguous edges of the lenses on the nasal sides thereof so as to readily permit the outward and inward pivotal movement of the eye cups 10 relative to each other about the axis of the pivot 22 as a center.

Due to the fact that the eye cups 10 are formed of a plastic material such as set forth above, the intermediate portion 25 of the area having the nasal recess therein will be free to flex and thereby permit the pivotal movement of the eye cups 10 relative to each other. The meeting edges 26 on the nasal sides of the lenses 14, as shown in Fig. 5, are curved so as to permit the angling of said lenses relative to each other, which results from pivotally moving the eye cups 10 inwardly or outwardly about the axis of the pivot pin 22 as a center.

The plate 20, as shown best in Fig. 4, is provided with a forwardly projecting slotted portion 27 adapted to receive the reduced end portion 28 of a tie member 29 preferably formed of metal. The tie member 29 has a lower reduced end portion 30 which is adapted to extend through a slot 31 formed in the intermediate portion 25. Portion 29' of the tie member 29 is of a width in excess of the dimensions of slots 27 and 31. The end portions 28 and 30 are respectively bent after being extended through respective slots so as to retain the tie member 29 in assembled relation with the plate 20 and intermediate portion 25. Portion 29' of the tie member 29 cooperates with the bent end portions 28 and 30 both to retain the lenses 14 inwardly of the groove 13 of the eye cups and to retain the upper and lower portions of the rims in spaced relation to each other. When it is desired to remove or interchange the lenses, all that is necessary is to straighten one or other of the respective end portions 28 or 30 so that the said end portion may be drawn outwardly of the adjacent wall. The lenses are then interchanged, with the new lenses positioned in the groove 13, and the said lenses are held therein by again opening said end of the tie member 29, as shown best in Fig. 4.

The portion 29' intermediate the reduced end portions 28 and 30 is provided with inwardly deflected opposed longitudinal edge portions 32 and 33 which function to straddle the meeting edges 26 of the lenses and which are adapted to intimately engage with the adjacent front surfaces of the lenses. The said edge portions 32 and 33 are provided with a resiliency which allows the said portions to flex slightly during the angling of the eye cups 10 relative to each other about the pivotal connection 22.

The said cup members 10, in the upper and lower surfaces thereof, are provided with a plurality of vent openings 34 and 35.

Each of the cup members 10 is provided with a slot 36 in the temporal sides thereof through which the ends 37 of the headband 38 are threaded. The said headband is preferably formed of elastic material and is of the usual conventional type employed with devices of this nature for retaining said devices in position of use.

Figure 7:
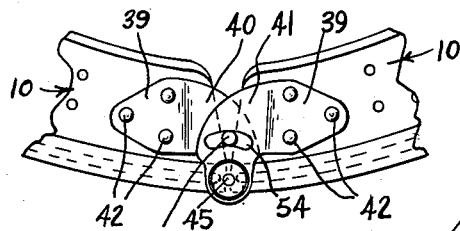
Fig. 7 is a fragmentary top plan view of the device illustrated in Fig. 6.
Figure 8:
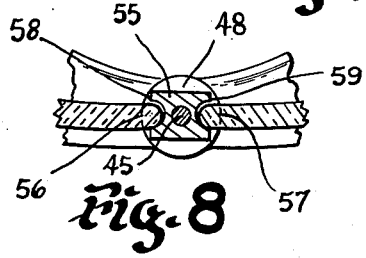
Fig. 8 is an enlarged fragmentary sectional view taken on line 8—8 of Fig. 6 and looking in the direction indicated by the arrows.
Figure 9:
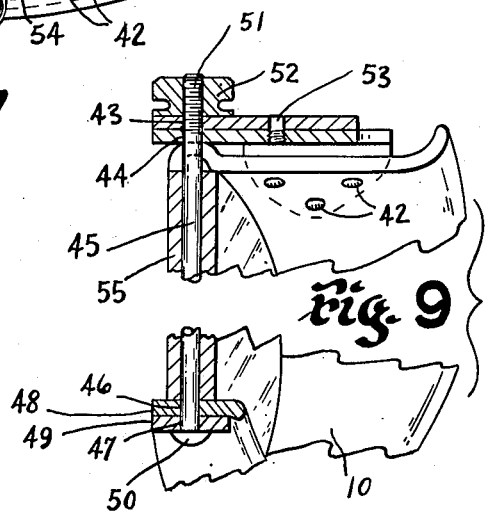
Fig. 9 is an enlarged fragmentary sectional view taken as on line 9—9 of Fig. 6 and looking in the direction indicated by the arrows.

In Figs. 6 through 9, there is shown a modified form of the invention wherein the eye cups 10 are divided at both the upper and lower nasal sides thereof. The upper nasal sides are provided with plate members 39 having overlapping portions 40 and 41 simulating the plate members 17 and 18. The said plate members 39 are secured to the eye cups 10 by rivets or the like 42. The said overlapping portions 40 and 41 are provided with aligned openings 43 and 44 adapted to receive the pivot pin 45. The said pivot pin 45 extends through aligned openings 46 and 47 formed in the lower overlapping tongue portions 48 and 49 on the lower nasal sides of the eye cups. The pivot pin 45 is provided with a lower enlarged head 50 for engaging the lower surface of the tongue portion 49 and is provided with an upper threaded end 51 to which a thumb nut 52 is threadedly connected. The said nut 52, after the eye cups have been adjusted to proper angular relation with each other, may be tightened to retain said eye cups in said relation. The portion 40 is provided with a stop pin 53 which extends within an arcuate slot 54 formed in the portion 41 and which is adapted to function cooperatively with said stop to limit the outward pivotal movement of said cup members about the pivot pin 45.

The pivot pin 45 extends through the central bore of a spacer member 55 located intermediate the nasal edges 56 and 57 of the lenses. The opposed side edges of the spacer member 55 are provided with longitudinal grooves 58 and 59, arcuate in cross section, adapted to receive the adjacent vertical nasal edges of the lenses. The said nasal edges are arcuate in cross section so as to fit within the longitudinal grooves of the spacer member 55. The spacer member 55 is free to rotate about the longitudinal axis of the pivot pin 45 and the fit of the related parts is such as to permit the eye cups to be angled relative to each other within controlled limits about the axis of the pivot pin 45 as a center. This is made possible by forming longitudinal grooves 58 and 59 slightly wider than the thickness of the adjacent nasal edges 56 and 57 of the lenses and by allowing sufficient play to permit the lenses to move in a slight sidewise direction relative to the grooves during the pivotal movement of the eye cups.

It is further pointed out that the lenses are preferably formed of sheet plastic material having a certain inherent resiliency which further aids in permitting said pivotal movement with no danger of the lenses becoming strained with the result that they might chip or break, which might occur if the lenses were formed of glass and proper clearance were not provided at the nasal sides thereof. The bases of the longitudinal grooves could be curved about the center of the pivot pin 45 to permit free pivotal movement of the eye cups within restricted limits while retaining the nasal edges of the lenses 56 and 57 in relatively intimate relation with the bases of said grooves.

It is to be understood that the upper and lower wall portions of the eye cups are provided with a plurality of ventilation openings such as referred to in connection with the construction of Figs. 1 through 5.

When it is desired to interchange or replace the lenses, all that is necessary is to loosen the thumb nut 52 whereby the upper and lower wall portions of the cup members adjacent the nasal sides thereof may be spaced an amount sufficient to permit the lenses to be removed from or positioned in the lens retaining grooves of the eye cups. After the lenses are in position within the grooves, the thumb nut is tightened, the eye cups are angled to the facial requirements and then locked in position by further tightening said thumb nut.

From the foregoing description, it will be seen that simple, efficient and economical means have been provided for accomplishing all the objects and advantages of the invention.

Having described my invention, I claim:

1. An eye protection device of the character described comprising a flexible wall portion shaped to extend above both eyes of the wearer across the brow, about the temporal sides of the face, cheeks and then upwardly to form a pair of eyecups having a nasal recess therebetween to bridge the nose, said wall portion having a face contacting portion on its rear side and a shield holding portion on its forward side, said wall being of sufficient rigidity to maintain the shield holding portion spaced from the face contacting portion and provide a unitary air chamber extending transversely of both eyes and above the nose of the wearer when in position of use, the face contacting portion substantially merging with the shield holding portion adjacent the nasal recess and with the upper wall of the device being divided above said nasal recess to provide separated ends, said separated ends having tongue portions in overlapping relation, and means pivotally connecting said tongue portions together for movement about an axis extending medially of the cup-like portions to intersect said nasally recessed portion and disposed to lie substantially within the plane of the location arranged by the shield holding portion, one of said tongue portions having an arcuately shaped groove and the other having a projection extending into the groove, said groove and projection functioning to control the pivoting of the eyecups about said pivot connection and a spacer member extending between said nasal recess and the pivotally connected tongue portions so as to overlie the nasal region of the shields to be assembled with the device and portions adjacent its opposed ends extendable through apertures formed in the adjacent portions of the device and detachably connected with said portions.

2. An eye protection device of the character described comprising a flexible wall portion shaped to extend above both eyes of the wearer across the brow, about the temporal sides of the face, cheeks and then upwardly to form a pair of eyecups and nasal recess to bridge the nose, said wall portion having a face contacting portion on its rear side and a shield holding portion on its forward side, said wall being of sufficient rigidity to maintain the shield holding portion spaced from the face contacting portion and provide a unitary air chamber extending transversely of both eyes and above the nose of the wearer when in position of use, the face contacting portion merging with the shield holding portion adjacent the nasal recess, and the upper wall of the device being divided above said nasal recess to provide separated ends, said separated ends being angled outwardly relative to each other, and plates secured to said ends having overlapping tongue portions pivotally connected for movement of the eyecups about an axis extending medially of the device to intersect said nasal recess and disposed to lie substantially within the plane of the location arranged by the shield holding portion, one of said tongue portions having an arcuately shaped groove and the other having a projection therein, said groove and projection functioning to control the pivoting of the eyecups about said pivot connection, and a spacer member extending between said nasal recess and the pivotally connected tongues so as to overlie the nasal region of the shields to be assembled with the eyecups and portions adjacent its opposed ends for detachable connection with one of said tongue portions and the nasally recessed portion of the device to permit ready insertion and removal of the shields.

3. An eye protection device of the character described comprising a flexible wall portion shaped to extend above both eyes of the wearer across the brow, about the temporal sides of the face, lower cheeks and then upwardly to form a pair of eyecups having a nasal recess therebetween to bridge the nose, said wall portion having a face contacting portion on its rear side and a shield holding portion on its forward side, said wall being of sufficient rigidity to maintain the shield holding portion spaced from the face contacting portion and provide a unitary air chamber extending transversely of both eyes and above the nose of the wearer when in position of use, and a pair of cylindrically curved transparent shields one mounted in the holding portion of each of said eyecups, said shields having their nasally disposed edges of generally cylindrical convex shape and substantially meeting along their length, and with said holding portions being arranged to maintain said shields to a substantially continuous arcuate shape, the face contacting portion of each eyecup substantially merging with the shield holding portion of the device adjacent the nasal recess and with the upper wall of the device being divided adjacent said meeting ends of the shields to provide separated ends, said separated ends being pivotally connected for movement about an axis extending between said meeting ends of the shields whereby the eyecups may be tilted inwardly toward each other about said axis to accommodate the face contacting portion thereof to the wearer's face while maintaining said shields to said substantially continuous arcuate shape, and a spacer member extending between said nasal recess and the pivotally connected tongues so as to overlie the nasal edges of said shields, and having portions adjacent its opposed ends for detachable connection with said tongue portions and the nasally recessed portion of the device.

4. An eye protection device of the character described comprising a pair of eyecups each having sidewalls provided with shield holding means adjacent the forward edge and having a face contacting portion spaced rearwardly therefrom, said sidewalls of each eyecup being shaped to follow about the lower, temporal and upper sides of the wearer's eyes when in position of use, and a pair of transparent shields one seated in the holding means of each of said eyecups with their nasally disposed peripheral edges being of generally cylindrical convexed shape and substantially meeting along their length, the lower side of one of said eyecups having the holding means thereof formed integrally with the holding means of the other eyecup, and the upper sides of the eyecups having overlapping tongue portions pivotally joined for movement about an axis disposed substantially intermediate the meeting edges of the shields, one of said tongue portions having an arcuately shaped groove and the other having a projection extending into the groove, said groove and projection functioning to control the pivoting of the eyecups about their pivotal joinder together with spacer means to overlie said meeting edges of the shields and having portions adjacent the ends thereof for detachable connection with the upper and lower portions of the device to permit the insertion and removal of shields.

5. An eye protection device of the character described comprising a pair of eyecups each having sidewalls provided with shield holding means adjacent the forward edge and having a face contacting portion spaced rearwardly therefrom, said sidewalls of each eyecup being shaped to follow about the lower temporal and upper sides of the wearer's eye when in position of use, and a pair of transparent shields one seated in the holding means of each of said eyecups, their nasally disposed peripheral edges being of convexed cylinder shape and substantially meeting along their length intermediate said eyecups, the lower side of one of said eyecups having the holding means thereof formed integrally with the holding means of the other eyecup, and the upper sides of the eyecups being pivotally joined for movement about an axis disposed substantially intermediate the meeting edges of the shields, together with spacer means to overlie said meeting edges of the shields and having portions adjacent the ends thereof for detachable connection with the upper and lower portions of the device to permit insertion and removal of the shields.

6. An eye protection device of the character described comprising a flexible wall portion shaped to extend above both eyes of the wearer across the brow, about the temporal sides of the face, cheeks and then upwardly to form a pair of eyecups and having a nasally recessed portion therebetween to bridge the nose, said portion having an opening therein, and said wall portion having a face-contacting portion on its rear side and a shield-holding portion on its forward side, said wall portion being of sufficient rigidity to maintain the shield-holding portion spaced from the face-contacting portion and provide a unitary air chamber extending transversely of both eyes and above the nose of the wearer when in position of use, the face-contacting portion substantially merging with the shield-holding portion adjacent the nasally recessed portion and with the upper wall of the device being divided above said nasally recessed portion to provide separated ends, said separated ends having tongue portions in overlapping relation with one of said tongue portions having an apertured portion extending forwardly of the plane of the location for the shield arranged by the shield-holding portion, and means pivotally connecting said tongue portions together for movement about an axis extending medially of the cup-like portions to intersect said nasally recessed portion and disposed to lie substantially within said plane of the location arranged by the shield-holding portion, and a spacer member extending between said nasally recessed portion and the pivotally connected tongue portions so as to overlie the nasal region of the shields to be assembled with the device, said spacer member having a portion adjacent one end extendable through the opening in the nasally recessed portion and a portion adjacent its opposed end extendable through the aperture in said forwardly extending portion of the tongue portion and in detachable connection therewith, the forwardly disposed end of the other tongue portion terminating rearwardly of said apertured portion of the first tongue portion whereby the eyecups are free for pivotal adjustment about their pivotal connection.

EDWARD M. SPLAINE.

REFERENCES CITED

The following references are of record in the file of this patent:

UNITED STATES PATENTS

| Number | Name | Date |
| --- | --- | --- |
| 1,099,404 | Spery | June 9, 1914 |
| 1,294,524 | Newbold | Feb. 18, 1919 |
| 2,391,349 | Ring | Dec. 18, 1945 |

FOREIGN PATENTS

| Number | Country | Date |
| --- | --- | --- |
| 359,601 | France | Mar. 31, 1906 |
| 23,603 | Great Britain | 1904 |
| 264,280 | Great Britain | Jan. 20, 1927 |